Nov. 30, 1965 H. J. MODREY 3,220,665

TAPE-THREADING AND REEL-LOCKING DEVICE FOR A TAPE REEL

Filed Sept. 1, 1964

INVENTOR
HENRY J. MODREY
BY Hane and Nydick
ATTORNEYS

United States Patent Office 3,220,665
Patented Nov. 30, 1965

3,220,665

TAPE-THREADING AND REEL-LOCKING DEVICE FOR A TAPE REEL

Henry J. Modrey, Eagle Drive, Stamford, Conn.

Filed Sept. 1, 1964, Ser. No. 393,701
20 Claims. (Cl. 242—74.1)

The present invention relates to a device for starting the winding of record tape upon a reel, and also for releasably retaining a supply or take-up reel on its spindle.

The device of the invention is particularly useful for a tape reel the hub of which has one or several axially directed tape-retaining holes, at least one of which is accessible through a slot in the periphery of the hub.

It is a broad object of the invention to provide a novel and improved device of the general kind above referred to in which the tape end can be secured in the reel hub without requiring delicate, careful and uncertain manipulation of the tape end.

A more specific object of the invention is to provide a novel and improved device of the general kind above referred to which holds the tape reel with a gentle but sufficiently firm non-metallic pressure to start winding of the tape even at high speeds without forming several overlapping turns by manual operation of the reel. This feature not only simplifies starting of the winding operation, but also makes it unnecessary to splice a special leader tape to the end of the magnetic tape.

Another more specific object of the invention is to provide a novel and improved device of the general kind above referred to which will not interfere in any way with the automatic winding of the tape, so that the device may be left attached to the reel during all recording and winding operations. Accordingly, if a device according to the invention is secured to both reels, the device will prevent the end of the tape from slipping out when the end of the reel is reached, and the tape can be repeatedly transported from one reel upon the other without having to attach the tape end each time to the reel upon which it is to be wound.

Still another object of the invention, allied with the next preceding one, is to provide a novel and improved device the holding or gripping pressure of which can be conveniently and accurately adjusted. Such adjustability protects the tape and the transport mechanism. The holding or gripping force may be so set that the tape automatically slips out of the reel at the end of a low-speed recording or playback operation, or on "fast forward or rewind" only, as desired. In either case, tearing of the tape or other damage thereto is safely avoided if the reel drive is not stopped before the end of the tape is reached.

A further more specific object of the invention is to provide a device of the general kind above referred to the gripping or locking elements of which are so arranged that no metal part touches the tape, thereby avoiding mechanical or magnetic damage to the tape.

It is also a broad object of the invention to provide a novel and improved device which combines the functions of a tape threader and of a reel lock with positive locking action.

A more specific object of the invention, allied to the next preceding one, is to provide a combination tape-winding and reel-locking device with which the tape can be fastened to the reel hub and the reel locked to its spindle in a single operation.

Another more specific object of the invention is to provide a combination tape-winding and reel-locking device which may be conveniently used as a crank for manually turning the reel. This method is very convenient for moving the tape manually by a few turns. If devices according to the invention are attached to both reels, they constitute, in effect, a tape-editing device, in that the tape can be accurately transported in either direction to locate tape spots at which it is desired to make erasures or splices.

A further more specific object of the invention is to provide a combination tape-winding and reel-locking device which is balanced so that the device does not interfere with the dynamic balance of the tape transport mechanism.

It is also a broad object of the invention to provide a novel and improved device of the general kind above referred to which can be conveniently adapted within a wide range to receiving holes of different diameters in reel hubs.

Other and further objects, features and advantages will be pointed out hereinafter and set forth in the appended claims constituting part of the application.

In the accompanying drawing several preferred embodiments of the invention are shown by way of illustration, and not by way of limitation.

Figures 1, 2, 3, 4, 5, 6, 7:
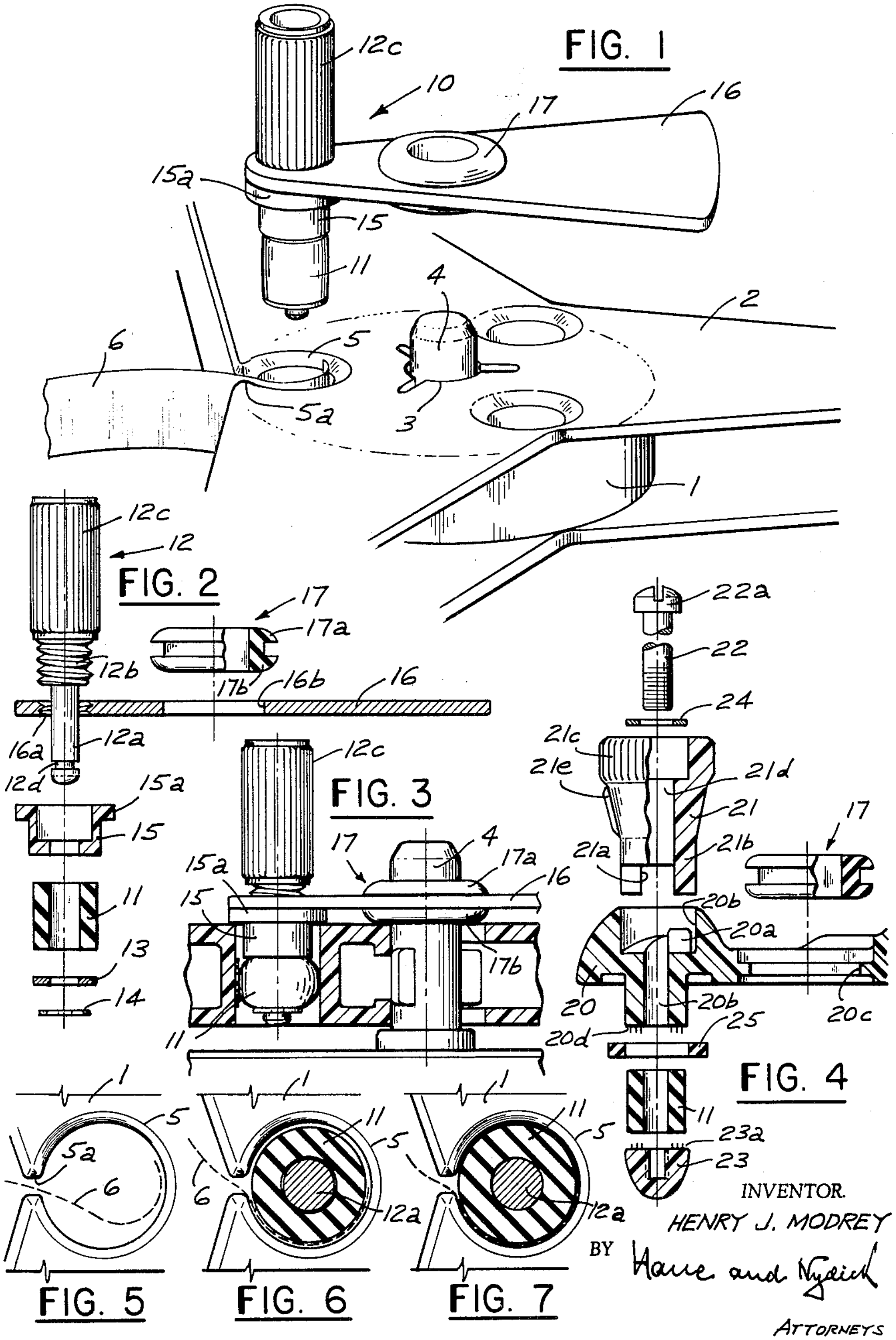
FIG. 1 is a perspective view of a combination device according to the invention ready for locking a tape to the reel and the reel to its spindle.
FIG. 2 is an exploded sectional view of the device.
FIG. 3 is a sectional view of the device locked to a reel to secure the tape on the reel hub and the reel on its spindle.
FIG. 4 is an exploded sectional view of a modification of the combination device.
FIG. 5 is a fragmentary plan view of a reel showing a tape end guided into a receiving slot.
FIG. 6 is a plan view similar to FIG. 5 and showing a section of the sleeve of the device loosely fitted in the receiving hole.
FIG. 7 is a view similar to FIG. 6 but showing the sleeve of the device in the condition in which the tape is locked in the receiving hole.

Referring now to the figures in detail FIG. 1 is a fragmentary perspective showing of a tape reel for use with a device such as a tape recorder. The reel comprises a hub 1 from which radiate arms 2 supporting the peripheral rim of the wheel. The hub has a central axial hole 3 for receiving the spindle 4 of the device, such as the driving spindle, when the reel is used as a take-up reel. The hub further includes three axially aligned holes 5, one of which has an etnrance slot 5*a* for receiving therein the end of a tape 6 to be wound upon the reel.

As previously explained, manual starting of the winding operation is conventionally effected by inserting the tape end into the retaining or receiving hole 5, pressing the tape with one finger against the hub and turning the reel by hand, while maintaining said finger pressure, until sufficient tape is retained on the reel to permit starting of the power winding. Subsequently, a reel lock is pushed onto the projecting end of each driving spindle.

As also previously stated, retention of the tape on the hub of the reel and of the reel on the spindle can be effected in a convenient, rapid and reliable manner by the combination tape-retaining and reel-locking device 10 according to the invention.

As is shown in the exploded view of FIG. 2, the tape-retaining part of the device comprises a sleeve 11 made of a suitable elastic material, such as rubber or a plastic composition. The sleeve in its relaxed condition has the illustrated cylindrical configuration. As is evident, application of lengthwise directed pressure to the sleeve will cause an outward bulging of the outer peripheral wall of the sleeve, and such outward bulging is utilized to lock the end of the tape in the receiving hole 5, as will be more fully described hereinafter. The device further comprises a shaft 12, which has a smooth portion 12*a*, a threaded portion 12*b*, and a gripping portion 12*c* constituting a grooved knob. The thread of portion 12*b* is preferably left-handed and rather coarse, and the general diameter of the threaded portion may be greater than that of smooth portion 12*a*. The latter portion has near its end a circumferential groove 12*d* which serves to secure a washer 13 on shaft portion 12*a* by slipping a springy split ring 14 into groove 12*d* Groove 12*d*, washer 13 and split ring 14 constitute fastening means for retaining sleeve 11 on shaft portion 12*a*. Other suitable fastening mean may of course be provided for the purpose. The device further comprises a spacer 15 made of a suitable non-metallic material, such as a plastic.

The afore-described components 11 through 15 of the device are assembled on a support plate 16, which has a threaded hole 16*a* for receiving the threaded portion 12*b* of shaft 12 and a hole 16*b* for receiving the spindle 4 of the tape recorder or other device in connection with which the reel is used. As will be more fully explained hereinafter, the support plate will lock the reel to the spindle when the tape-retaining part of the device is locked to the reel. While a receiving hole such as hole 16*b* is generally adequate, it is preferable to provide a grommet 17 made of a suitable elastic material, such as rubber or a rubber composition. The inner diameter of the grommet is such that the spindle is engaged with a frictional grip.

Assembly of the device is effected by first screwing threaded shaft portion 12*b* into the threaded hole 16*a* of support plate 16. Spacer 15, sleeve 11 and washer 13 are then slipped upon the shaft, in that order. The entire assembly is finally locked together by forcing split ring 14 into groove 12*d*. The grommet 17 is forced into hole 16*b* so that the portions 17*a* and 17*b* of the grommet overlie the support plate on opposite sides thereof. The assembled device is clearly shown in FIGS. 1 and 3. Referring to FIG. 3, it can be seen that flange 15*a* of spacer 15 and grommet portion 16*b* are of substantially the same thickness so that the support plate 16 is substantially parallel to the top side of the reel hub 1 when the device is fitted upon the reel, as will be described hereinafter.

The portion of support plate 16 to the right of hole 16*b* as seen in FIG. 1 is comparatively long and wide and is so correlated with the portion of the support plate to the left of hole 16*b* and the components supported thereon that the device is substantially in dynamic balance. As a result, the device can be left attached to the reel when the latter is rotating, without interfering in any way with the smooth functioning of the tape transport.

As is evident from the previous description of the assembly of the device, the lengthwise distance available for the sleeve 11 is controlled by the position of shaft 12 in reference to support plate 16. Accordingly turning of shaft 12 in one direction will shorten this distance, and turning in the other direction will increase it. As is evident, shortening of the distance available for the sleeve will cause a lengthwise compression of the sleeve, and hence an outward bulging of the same, as previously indicated, while turning of the shaft in the opposite direction will permit the sleeve to recover its illustrated relaxed condition.

The diameter of the sleeve in its relaxed condition is such that the sleeve can be inserted in the receiving hole 5 of the reel hub with a loose fit.

The function of the device as hereinbefore described is as follows:

Let it be assumed that the end of tape 6 is guided into receiving hole 5 through slot 5*a* thereof, as is best shown in FIGS. 1 and 5. As can be seen from these figures, the tape end lies loosely in the receiving hole, conforming more or less to the peripheral wall thereof. The device is now brought from the position of FIG. 1 into that of FIG. 3 (disregarding for the time being the fact that the sleeve is shown strongly bulged in FIG. 3). Substantially simultaneously with the insertion of sleeve 11 in its fully relaxed or slightly compressed condition into the receiving hole, the spindle penetrates through the spindle-receiving hole 16*b* in support plate 16. Accordingly, the insertion of sleeve 11 into the receiving hole 5 automatically results in a locking of the reel on its spindle in a single operation. This is a friction lock, which is not completely secure. It will be explained later that tightening of the device in the hub hole establishes positive reel-locking action.

FIG. 6 shows the sleeve 11 in its relaxed or slightly compressed condition inserted in hole 5. This figure also shows that the tape end is now lying between the outer wall of the sleeve and the hub wall defining hole 5, but the tape end is still loose within the receiving hole.

To lock the tape end in the receiving hole, knob 12*c* is turned into the appropriate direction. As previously described, such turning results in a pronounced outward bulging of the sleeve, as shown in FIG. 3. The tape end is thus safely locked between the sleeve and the respective hub wall, as is indicated in FIG. 7.

The whole device is now positively locked to hole 5 in the reel hub. Since the base plate 16 of the device is thereby made immovable, it cannot now move relative to drive spindle 4. The preliminary locking of the reel established by pushing grommet 17 over drive spindle 4 has thus become a positive lock.

The power drive of the recorder or other device may now be started directly, without first manually winding a few turns of the tape upon the reel hub. As has been previously stated, such possibility of immediately starting the power drive not only simplifies the starting operation, but also eliminates the need for a spliced-on leader tape.

As is evident, the force with which the tape end is locked in the receiving hole is determined by the extent of the bulging of sleeve 11, which in turn is controlled by the turning of shaft 12. Accordingly, the locking force may be conveniently and accurately adjusted by turning shaft 12 more or less. Such adjustability provides a convenient means for selecting the locking force in accordance with the specific operation which is intended. A rather weak locking force may be selected, for instance, for fast rewind when it may be desired that the tape slip out of the reel at the end of the rewind, to avoid tearing of the tape if the rewind is not stopped in time. A comparatively weak locking force may be used also when an automatic release of the tape is desired at the end of the playback.

To prevent slipping of the tape out of the reel hub at the beginning of a winding operation, the shaft may be initially turned tight and then slightly turned in the opposite direction at the end of the winding operation to loosen the locking grip.

Release of the tape from the reel may be effected by turning the knob sufficiently to permit return of the sleeve into its relaxed or slightly compressed condition. The entire device can then be simply lifted up, thereby also releasing the reel from the spindle.

The afore-described adjustability of the bulging of the sleeve by turning shaft 12 more or less affords the further important advantage that the device will fit different diameters of receiving holes in the hub within practical limits. A small receiving hole will require a comparatively slight bulging of the sleeve to effect locking of the tape, whereas a large receiving hole will require a stronger bulging of the sleeve before the tape is locked.

As has been stated previously, the device according to the invention may be left on the reel during the power winding operation and also during playback. By utilizing this feature and attaching a device to both the take-up reel and the idler or supply reel, editing of the tape may be facilitated by manually transporting the tape in either direction.

FIG. 4 shows a modification of the afore-described device. The modification according to FIG. 4 utilizes the same principle and performs the same dual functions of retaining the tape on the reel hub and locking the reel to the spindle, but is different in some of its structural aspects.

The device according to FIG. 4 again comprises a sleeve 11. The lengthwise compression of the sleeve is effected according to FIG. 4 by a cam means. The cam means comprises a cam surface 20*a* formed in a shouldered hole 20*b* of a support plate 20. The cam surface coacts with a cam follower 21*a* formed at one end of an actuating knob 21. If desired, two cam surfaces, each extending through slightly less than 180°, may be provided. The portion 21*b* of the knob terminating in said cam follower 21*a* fits into a wide portion of the hole 20*b* of the support plate so that the cam follower will coact with the cam surface. The upper portion of knob 21 is preferably knurled at 21*c* to facilitate turning of the knob in reference to the support plate. A locking bolt 22 is extended through a hole 21*d* in knob 21, through the hole 21*b* of the support plate and the sleeve 11. The end of the bolt is screwed into a generally cone-shaped locking nut 23, which also constitutes a guide for applying the device to the reel. As is evident, the guide cone will push aside the tape in hole 5 so that the sleeve 11 can enter without difficulty. In this connection, it may be mentioned that the sleeve-fastening means of FIG. 2 may be replaced by a cone-shaped guide nut, such as nut 23. A washer 24 is preferably fitted between the head 22*a* of bolt 22 and the hole 21*d* of the knob to prevent pulling of the bolt head into hole 21*d*. A second washer 25 is slipped upon the portion 20*b* of the support plate.

Support plate 20 has a second hole 20*c* into which is forced a grommet 17 for receiving the spindle 4 with a friction grip, as described in connection with FIGS. 1, 2 and 3.

As indicated in the drawing, all the afore-described components of the device, with the exception of bolt 22 and washer 24, are made of a non-metallic material. Sleeve 11, washer 25, grommet 17 and support plate 20 may be made of rubber or a plastic composition. The cam surface 20*a* may be molded directly into the support plate 20. The knob 21 and cone-shaped nut 23 may be made of metal or plastic.

The assembly of the device is generally self-evident. It is sufficient to state that the components of the device are held together in the spatial order in which they are shown by screwing bolt 22 into guide nut 23. Bolt 22 is preferably tightened in nut 23 to an extent such that sleeve 11 is slightly compressed. The resulting pressure engagement between the ends of sleeve 11 and the adjacent surfaces of support plate 20 and nut 23 provide a starting friction which assures that sleeve 11 will not idle when knob 21 is turned to lock the device. In order to assure fruther that the sleeve will not idle, points or sharp teeth 20*d* and 23*a* are preferably provided in the abutting surfaces of the support plate and the nut, respectively. These teeth will bite into the material of the sleeve.

As is evident from the description of the device shown in the preceding figures, the configuration of sleeve 11 again is determined by the space available for the sleeve between the adjacent face sides of the support plate and nut 23. This space can be shortened by turning knob 21 in reference to the support plate 20 so that the cam follower 21*a* will ride up on the cam surface 20*a*. The resulting outward bulging of sleeve 11 will lock an inserted tape end in the receiving slot in the manner previously described.

To retain knob 21 in its locking position, a conventional groove forming a rest position for the cam follower is provided at the apex of the cam surface 20*a* (or both cam surfaces).

Similarly, turning of the knob 21 in the opposite direction will release the locked tape by permitting the sleeve to re-expand.

A lengthwise nose 21*e* on the knob constitutes an indicator which visually indicates whether the sleeve 11 is in its relaxed condition; that is, whether the device is ready for insertion. The indicator is so placed that it faces lengthwise of the support plate 20 when the device is ready for insertion. When it is turned crosswise of the support plate, it indicates to the user that the knob must be turned before the device can be inserted.

The operation of the device according to FIG. 4 will be evident from the foregoing description. It suffices to state that the insertion of the device into the receiving hole of the reel and the positive locking of the reel on the spindle by the device are again effected in a single operation.

As may be noted from the figures and the foregoing description, in both the illustrated and described exemplifications of the invention all the parts of the device which come in contact with the tape when the same is locked in the reel hub are non-metallic, to wit, either rubber or plastic, thereby avoiding any deleterious mechanical or magnetic effect upon the tape by the locking operation.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for releasably securing a tape in a receiving hole of a tape reel and said reel on a spindle, said device comprising an elastic sleeve compressible lengthwise from a relaxed condition in which said sleeve fits said receiving hole with a loose fit to permit insertion of an end of said tape between said sleeve and the wall of the receiving hole to an outwardly bulging compressed condition in which the inserted tape end is locked in the receiving hole, actuating means coacting with said sleeve for selectively forcing the same into its bulging condition and freeing the sleeve for return into its relaxed condition, and a support plate supporting said actuating means, said support plate including a hole fittable upon a reel spindle to retain the reel releasably upon said spindle.

2. A device according to claim 1, wherein an elastic lining encompasses the rim of said hole in the support plate, said lining providing a frictional grip for the spindle.

3. A device according to claim 2, wherein said elastic lining is in the form of a grommet overlying both sides of the support plate.

4. A device according to claim 1, wherein said support plate is an elongated plate, said hole therein being situated so that the lengthwise portions of the plate on opposite sides of said hole are susbtantially in dynamic balance.

5. A device for releasably securing a tape in a receiving hole of a tape reel, said device comprising an elastic, lengthwise compressible sleeve received in its relaxed condition in said receiving hole with a loose fit to provide space for the insertion of an end of said tape between said sleeve and the wall of the receiving hole, a support plate having a hole therethrough, a shaft extended through said hole displaceable lengthwise in reference to the plate by selective increments, the shaft portion on one side of the plate protruding through the hole of the sleeve, and an abutment means secured to the protruding shaft portion and abutting against the sleeve end opposite said support plate, whereby displacement of the shaft in one direction in reference to the plate shortens the distance available for the sleeve between said abutment means and the plate, thus causing outward bulging of the sleeve, said outward bulging locking the inserted tape end in the receiving opening, and displacement of the shaft in the opposite direction increases said available distance, thus freeing the sleeve for return into its relaxed condition to release the locked tape end.

6. A device for releasably securing a tape in a receiving hole of a tape reel, said device comprising an elastic lengthwise compressible sleeve received in its relaxed condition in said receiving hole with a loose fit to provide for the insertion of an end of said tape between the sleeve and the wall of the receiving hole, a support plate having a threaded hole therethrough, a shaft having a threaded portion threaded into said hole from one side of the plate and a portion extending from the other side of the plate through the hole of said sleeve and protruding from the outer end thereof, and sleeve-locking means overhanging the hole through the sleeve and secured to said protruding shaft portion, whereby turning of the shaft in reference to the sleeve into a predetermined direction shortens the distance available for the sleeve between said locking means and the plate, thus causing outward bulging of the sleeve, said outward bulging locking the inserted tape end in the receiving opening, and turning of the shaft into the opposite direction increasing said available distance, thus freeing the sleeve for return into its relaxed condition and releasing the locked tape end.

7. A device according to claim 6, wherein said locking means comprises a locking plate abutting against the sleeve face opposite said support plate and secured to said protruding shaft portion.

8. A device according to claim 7, wherein said locking plate is slidable on said protruding shaft portion, said shaft portion having at its end a circumferential groove, and wherein a springy split ring is fitted in said groove to retain said locking plate on the shaft.

9. A device according to claim 5, wherein a non-metallic spacer is interposed between said support plate and the adjacent face of said sleeve.

10. A device according to claim 5, wherein said support plate includes a hole fittable upon a reel spindle to retain the reel on said spindle.

11. A device according to claim 10, wherein an elastic lining encompasses the rim of said hole in the support plate, said lining providing a frictional grip for the spindle.

12. A device according to claim 11, wherein a non-metallic spacer is interposed between said support plate and the adjacent face of the sleeve, said spacer having a flange adapted to overlie the reel when the sleeve is inserted into the receiving hole thereof, and wherein said elastic lining is in the form of a grommet overlying both sides of the support plate, the thickness of said flange and the thickness of said grommet on the respective side of the support plate being substantially equal.

13. A device according to claim 5, wherein said support plate is an elongated plate, said hole therein being situated so that the lengthwise portions of the plate on opposite sides of the hole are substantially in dynamic balance.

14. A device for releasably securing a tape in a receiving hole of a tape reel, said device comprising an elastic lengthwise compressible sleeve received in its relaxed condition in said receiving hole with a loose fit to provide space for the insertion of an end of said tape between said sleeve and the wall of the receiving hole, a support plate having a shouldered hole therethrough, the face of the shoulder in the hole defining a cam surface, an annular cam follower coacting with said cam surface, said cam follower being disposed on one side of the support plate and the sleeve on the other side, a locking stud extending through said cam follower, said hole in the support plate and said sleeve and protruding from the respective end of the sleeve, and abutment means abutting against the sleeve face opposite the support plate and secured to said protruding stud portion, whereby turning of the cam follower in reference to said cam surface and the sleeve into one direction shortens the distance available for the sleeve between said abutment means and the plate, thus causing outward bulging of the sleeve, said outward bulging locking the inserted tape end in the receiving opening, and turning of the cam follower into the opposite direction increases said available distance, thus freeing the sleeve for return into its relaxed condition and releasing the locked tape end.

15. A device according to claim 14, wherein said abutment means comprises a generally cone-shaped guide member fastened to said protruding stud portion.

16. A device according to claim 14, wherein said support plate includes a hole fittable upon a reel spindle to retain the reel releasably upon said spindle.

17. A device according to claim 16, wherein an elastic lining encompasses the rim of said hole in the support plate, said lining providing a frictional grip for the spindle.

18. A device according to claim 17, wherein said elastic lining is in the form of a grommet overlying both sides of the support plate.

19. A device according to claim 14, wherein said support plate is an elongated plate, said hole therein being situated so that the lengthwise portions of the plate on opposite sides of the hole are substantially in dynamic balance.

20. A device according to claim 14, wherein an actuating knob is provided on said locking stud, and wherein an indicator on said knob visually indicates whether said sleeve is in its relaxed condition or in its bulging condition by the position of the indicator in reference to said support plate.

References Cited by the Examiner

UNITED STATES PATENTS

| | | | |
|---|---|---|---|
| 2,586,376 | 2/1952 | Picton | 242—74.1 X |

FOREIGN PATENTS

| | | |
|---|---|---|
| 742,606 | 1/1933 | France. |
| 637,371 | 5/1950 | Great Britain. |

MERVIN STEIN, *Primary Examiner.*